United States Patent
Chen (10) Patent No.: US 8,893,096 B1
(45) Date of Patent: Nov. 18, 2014

(54) FILE MIGRATION IN DISTRIBUTED SYSTEMS

(71) Applicant: Google Inc., Mountain View, CA (US)

(72) Inventor: Jun Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 13/624,081

(22) Filed: Sep. 21, 2012

Related U.S. Application Data (63) Continuation of application No. 12/627,410, filed on Nov. 30, 2009, now abandoned.

(51) Int. Cl.
*G06F 9/45* (2006.01)
*G06F 9/44* (2006.01)
*G06F 9/445* (2006.01)

(52) U.S. Cl.
CPC .............. *G06F 8/41* (2013.01); *G06F 9/44521* (2013.01)
USPC ........................... 717/140; 717/162; 717/163

(58) Field of Classification Search
CPC ................................ G06F 8/41; G06F 9/44521
USPC ................................................. 717/140–167
See application file for complete search history.

(56) References Cited

U.S. PATENT DOCUMENTS

| | | | | |
|---|---|---|---|---|
| 5,740,446 A | * | 4/1998 | Fujiwara | 717/154 |
| 6,279,151 B1 | * | 8/2001 | Breslau et al. | 717/140 |
| 6,968,543 B2 | * | 11/2005 | Takahara et al. | 717/140 |
| 6,968,548 B1 | * | 11/2005 | Tabbert | 717/162 |
| 7,213,238 B2 | * | 5/2007 | Klarer et al. | 717/140 |
| 2001/0054177 A1 | * | 12/2001 | Takahara et al. | 717/10 |
| 2003/0041318 A1 | * | 2/2003 | Klarer et al. | 717/140 |
| 2003/0056197 A1 | * | 3/2003 | Dennis et al. | 717/126 |

* cited by examiner

*Primary Examiner* — Qing Chen
(74) *Attorney, Agent, or Firm* — Honigman Miller Schwartz and Cohn LLP (57) ABSTRACT

Methods, apparatuses, and systems for file migration in distributed systems. A data structure definition is added to a programming language source code and initialized. Initialization values include contents of a first data file that is external to the source code file. The source code file is compiled with one or more other source code files to create an executable program that includes the initialization values as part of the program's image. During execution, the executable program creates a different second data file external to the executable program by reading the initialization values from the initialized data structure and writing the values to the second data file. This second data file is accessible by a library linked to the executable program.

17 Claims, 4 Drawing Sheets

FILE MIGRATION IN DISTRIBUTED SYSTEMS

CROSS REFERENCE TO RELATED APPLICATIONS

This U.S. patent application is a continuation of, and claims priority under 35 U.S.C. §120 from, U.S. patent application Ser. No. 12/627,410, filed on Nov. 30, 2009, now abandoned, which is hereby incorporated by reference in its entirety.

TECHNICAL FIELD

The present specification relates to managing files, for example, files in distributed systems.

BACKGROUND

In computing, a distributed file system allows applications executing on a host computer to access files located on separate, remote host computers as though the accessed files are on the host computer. To do so, distributed systems can operate in clusters of computers. When a user accesses the cluster to execute an application, a cluster management system that manages the file system virtualizes the entire cluster as a single machine to the application. The identity of the computer in the cluster that executes the application is typically transparent to the application. The distributed file system dynamically assigns a computer to execute the application. When an application executed by a computer in the cluster requires access to one or more files for execution, the distributed file system makes the file available to the application.

SUMMARY

In general, one innovative aspect of the invention described can be implemented as a method comprising adding, by a data processing apparatus, a data structure definition to a programming language source code file. The method includes an initialization of the definition. Initialization values include contents of a first data file external to the source code file. The initialization values are added to the source code file. The method includes compiling, by the data processing apparatus, the source code file with one or more other source code files to create an executable program that includes the initialization values as part of the executable program's image. During execution, the executable program is configured to create a different second data file external to the executable program by reading the initialization values from the initialized data structure and writing the values to the second data file accessible by a library linked to the executable program.

This, and other aspects, can include one or more of the following features. The method can further include determining that the library depends on the first data file. The executable program can link to the library shooting the execution. The different second data file can be created in a directory local to be working directory of the executable program. The method can further include encoding the initialization values. The method can further include compressing the initialization values. The executable program can include logic to decompress the compressed source code file to create the different data file. The one or more source code files can include logic that caused the executable program to create the different second data file during execution. The method can further include deploying copies of the executable program to multiple computers.

Another innovative aspect of the invention described can be embodied in a computer-readable medium, tangibly embodying software instructions, executed by a data processing apparatus to perform the operations described above. Yet another innovative aspect of the invention described can be embodied in a system including a data processing apparatus and a computer-readable medium encoding software instructions executed by the data processing apparatus to perform the operations described above.

Particular implementations of the subject matter described in this specification can be implemented to realize one or more of the following advantages. Storing a data file as a data structure in an application means the data file is available to the application no matter which computer the application executes on. The data in the application data structure can be encoded or compressed. During execution, the application reads the data in the data structure and writes the data to a local file. This makes the data file available to a library, for example, a third party library, that links to the application and that requires the data file. When the application executes on a different computer, the data file is also available on the different computer because the data file is always part of the executable program. In this manner, the application can easily migrate between different computers in a farm (e.g., if a computer on the farm crashes or becomes unavailable). Alternatively, or in addition, the application can easily migrate from an overloaded computer to a less loaded computer.

The details of one or more implementations of the specification are set forth in the accompanying drawings and the description below. Other features, aspects, and advantages of the specification will become apparent from the description, the drawings, and the claims.

DESCRIPTION OF DRAWINGS

Like reference numbers and designations in the various drawings indicate like elements.

DETAILED DESCRIPTION

Figure 1:
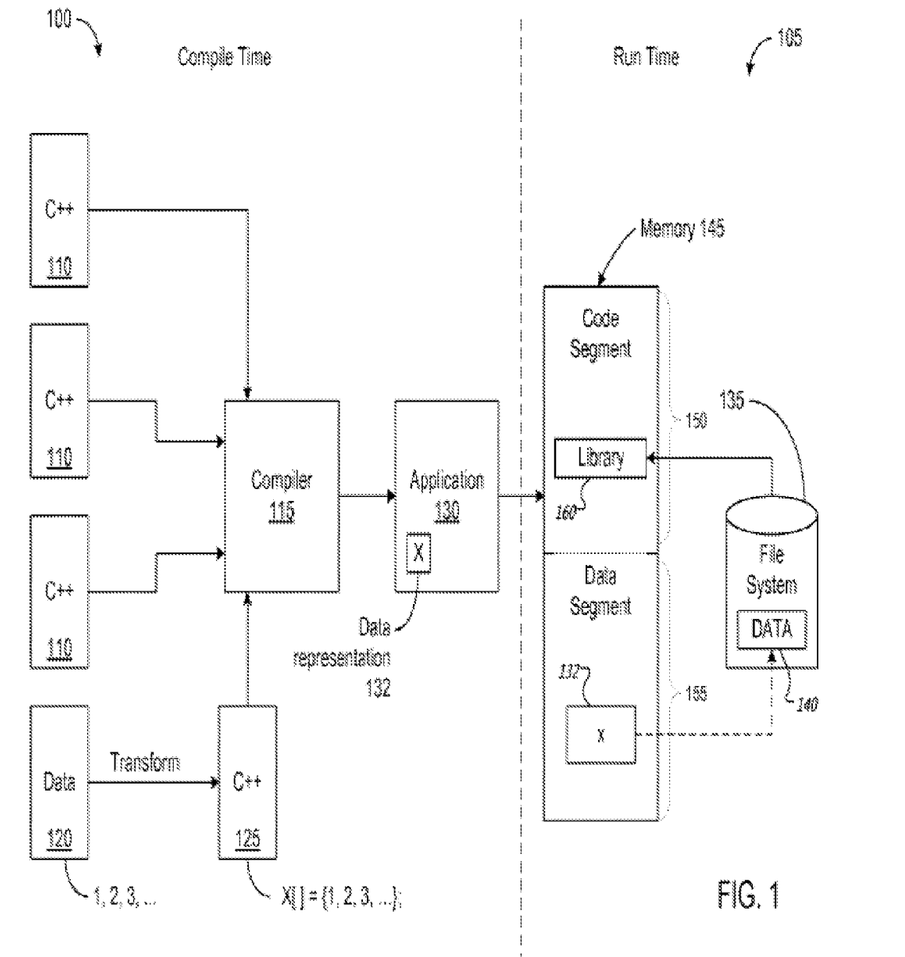
FIG. 1 shows an example application executing system operating during compile time and run time.

FIG. 1 shows an example application executing system operating during compile time 100 and run time 105. Compile time 105 describes an environment in which source code files including computer code, for example, C++ code, are compiled to generate object code files that are linked with the binary to form an executable image. In some implementations, multiple source code files 110 are compiled by a compiler 115 into object code files. A data file 120 is included in addition to the source code files 110. The data in the data file 120, for example, {1, 2, 3, . . . }, is used by a library that executes an application, as described later. The data file 120 is transformed into a source code file 125 that includes an initialization of a data structure definition that represents the data in the data file 120. For example, the initialization is represented by "X[ ]={1, 2, 3, . . . };." The source code file 125, obtained by transforming the data file 120, is also provided to the compiler 115 that generates an application 130, executable by a file system 135, and including a binary image having a representation 132 of the data in the data file 120.

During run time 105, a memory 145 includes the image (data and instructions) required to execute the application 130 including the data representation 132. In some implementations, the memory 145 includes a code segment 150 that includes executable instructions. The executable instructions can include a library 160 of executable instructions configured to be invoked by the application 130. The memory 145 also includes a data segment 155 including static data (for example, data representation 132) representing the global variables that are initialized. When the application 130 is executed, the data representation 132 included in the application 130 is written as a data file 140 in the file system 135, as described later. The application 130 or its library 160 can access the data file 140 from the file system. In this manner, the data file 140 is available locally to the file system 135 to execute the application 130. In implementations described with reference to FIG. 2, the application 130 can be executed by multiple computers, for example, in a distributed file system, such that the data is written to each computer when the application is executed, thereby making the data available locally to each computer.

Figure 2:
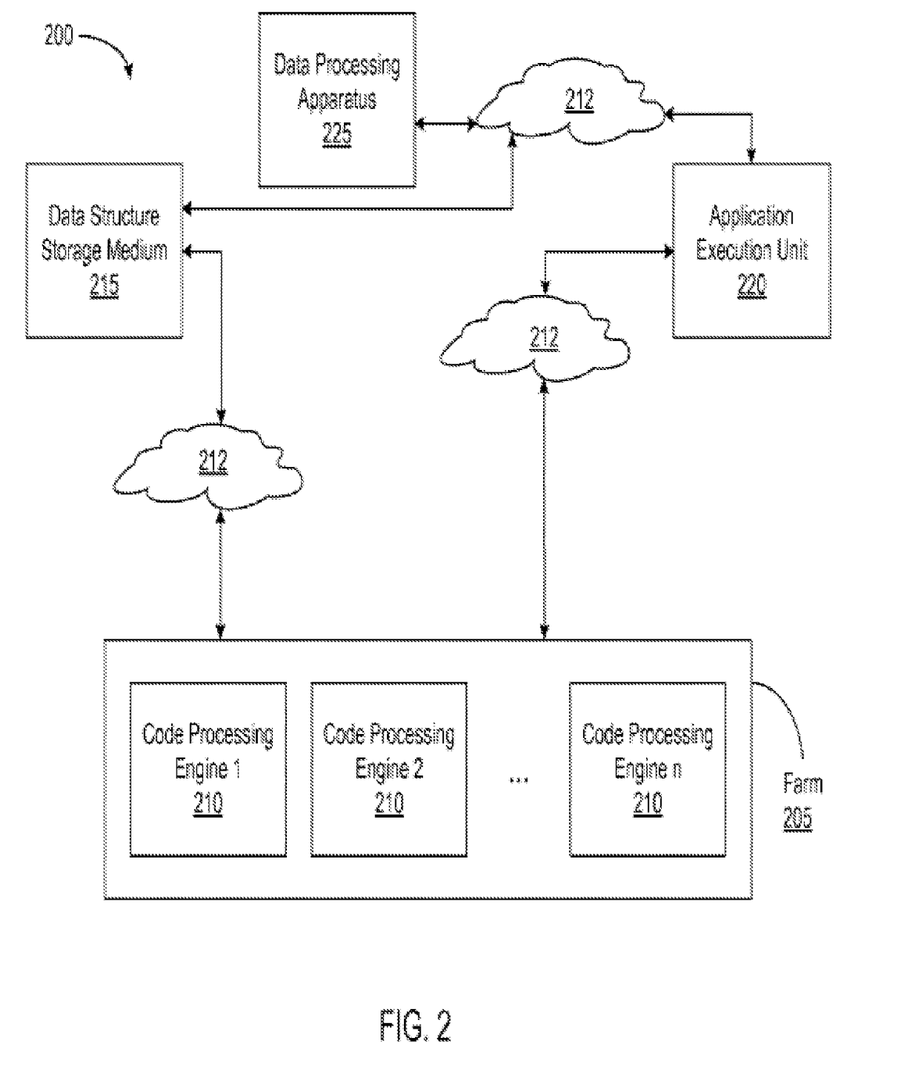
FIG. 2 shows an example system for executing an application.

FIG. 2 shows an example system 200 for executing an application. The system 200 includes a farm 205 that comprises multiple code processing engines 210, for example, code processing engines 1, 2, ..., n. In some implementations, each code processing engine 210 is a data processing apparatus, for example, a computer, that is configured to execute applications. In some implementations, the farm 205 is operatively coupled to a storage medium 215, for example, a disk drive or disk array, and an application execution unit 220 that is configured to cause the code processing engines 210 to execute the executable program associated with the application execution unit 220. In some implementations, the storage medium 215 can be separate and remote from the farm 205. Alternatively, the medium 215 can be included in the farm 205. In some implementations, the storage medium 215 and the application execution unit 220 can each be operatively coupled to the farm 205 through one or more wired or wireless networks 112 such as the Internet, for example. The system 200 includes data processing apparatus 225 operatively coupled to the farm 205, the storage medium 215, and the application execution unit 220, and configured to perform operations described below. In some implementations, the data processing apparatus 215 can be included along with the code processing engines 210 in the farm 205.

In some implementations, the application execution unit 220 stores a computer program that is executable by the code processing engines 210 in the farm. The computer program can be uploaded to the application execution unit 220 and then transmitted to the farm 205 through the networks 112. In some scenarios, the computer program was written in a programming language such as C++, for example. Other programming languages are possible, however. For execution, the application can require a data structure representing data that is stored in a file on the storage medium 215. Specifically, for example, the application can require that the data structure be available on those code processing engines 210 executing the application. The data processing apparatus 225 can provide the data structure to such code processing engines 210. To do so, the data processing apparatus 225 can add the data structure definition to the source code of the computer program and also add an initialization of the definition. The initialization values can include contents of the data file storing the data, and can be added to the source code file.

Subsequently, the data processing apparatus 225 can compile the source code file with one or more other source code files to create an executable program that includes the initialization values as part of the executable program's image. The executable program can be provided to those code processing engines 210 executing the application, and are executable by each of the code processing engines 210. The data processing apparatus 225 configures the executable program such that, during execution, the executable program creates a different second data file that is external to the executable program. To do so, the code processing engine 210 executing the executable program reads the initialization values from the initialized data structure and writes the values to the second data file, which is accessible by a library linked to the executable program. In this manner, the data in the data structure is written only to those code processing engines 225 on which the application executes the executable program.

In some implementations, the computer program is a C++ program. In such implementations, the data processing apparatus 225 retrieves the data structure, for example, a C++ language data structure, stored in the storage medium 215 and converts the data file into a byte-array represented by an array of bytes. In this manner, the data processing apparatus 225 converts the data structure into source code, i.e., the byte-array. Subsequently, the data processing apparatus 225 compiles the source code into object code and links the object code to form an executable image. Consequently, the data file becomes the data of a executable image and is stored in the memory. When the application execution unit 220 executes the image, for example, on those code processing engines 210 executing the application, then the application execution unit 220 reads the binary image because the byte array is an array of bytes in the data segment of memory.

Once the application execution unit 220 reads the binary image, the unit 220 can create a temporary local file in the code processing engine 210 in which the application is executing. For example, if 100 code processing engines 210 are executing the application, then the application execution unit 220 will read the array of bytes in the data segment of the memory of each of the code processing engines 210, and will write the contents of the memory on each engine 210. By doing so, the temporary local file can be created and stored in each of the code processing engines 210. In some implementations, the temporary local file created on each code processing engine 210 can be given a file name that can be provided to a third party library. Using the file name, the third party library can access the temporary local file. Details of the techniques using which the temporary local file is created are described with reference to FIG. 2.

Figure 3:
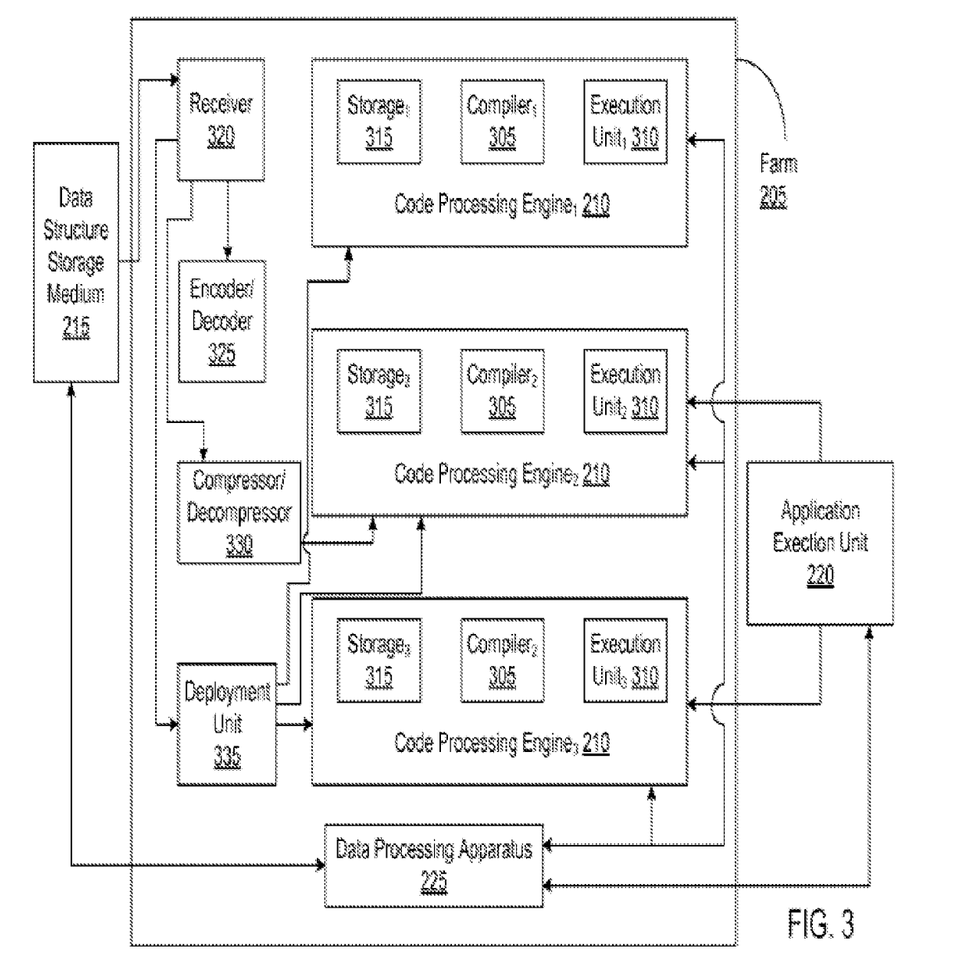
FIG. 3 shows an example system for executing an application in a distributed file.

FIG. 2 shows an example system to execute an application in a distributed file system. As described previously, the application execution unit 220 stores an application that is executable by one or more of the code processing engines 210 in the farm 205. To do so, the application execution unit 220 requires data in a file that is stored in the storage medium 215. To create a temporary local file that contains the required data in those code processing engines 210 that execute the application, the data processing apparatus 225 retrieves the data file. In some implementations, the data processing apparatus 225 will read the data file from the storage medium 215 and generate a source code file, for example, a ".cc" file. The generated ".cc" file includes an array of characters, each of which represents the data that is required by the application. For example, the data processing apparatus 225 reads out the data stored in the file, puts the read-out data into an array structure for C++, stores the array structure in a C++ file, and compiles the array structure as static data. For example, the data processing apparatus 225 creates a 1000 byte data structure in source file that contains the array of characters, each of which corresponds to content in the data file.

Upon creation, the data processing apparatus 225 gives the source code file a name, for example, a name based on the naming conventions of C++ source code files. The data processing apparatus 225 then compiles the source code file into a separate object code file, for example, an object code file having a ".o" file name. The data processing apparatus 225 then links the ".o" file to the binary and gives the array name to the executable, i.e., the computer program executed on the code processing engines 210. The program uses the array name to reference the array and to read the data bytes stored within. Thus, the data processing apparatus 225 takes an ordinary text file and generates a source code file, for example, a C++ file, that contains the data as an array of bytes. Consequently, the text file that is needed for the application to execute is converted to source code. Subsequent to compiling, object code generation, and linking to the executable image, when the program executes the image, the byte array is read from the image and written to storage.

In some implementations, the compiling operations can be performed by a compiler 305 included in each code processing engine 210. The code processing engines 210 can each include an execution unit 310 to execute the computer program and storage 315 to store the temporary local file and other data. Each execution unit 310 generates a temporary local file including the contents of the data file stored in the storage medium 215, and stores the temporary local file in the storage 315. The instructions to read out the data in the storage medium 215 and store the data as an array structure also includes instructions to write the data to a directory that is local to a working directory of the executing program in the storage 315. The processes performed by the system 200 are described with reference to FIG. 3

Figure 4:
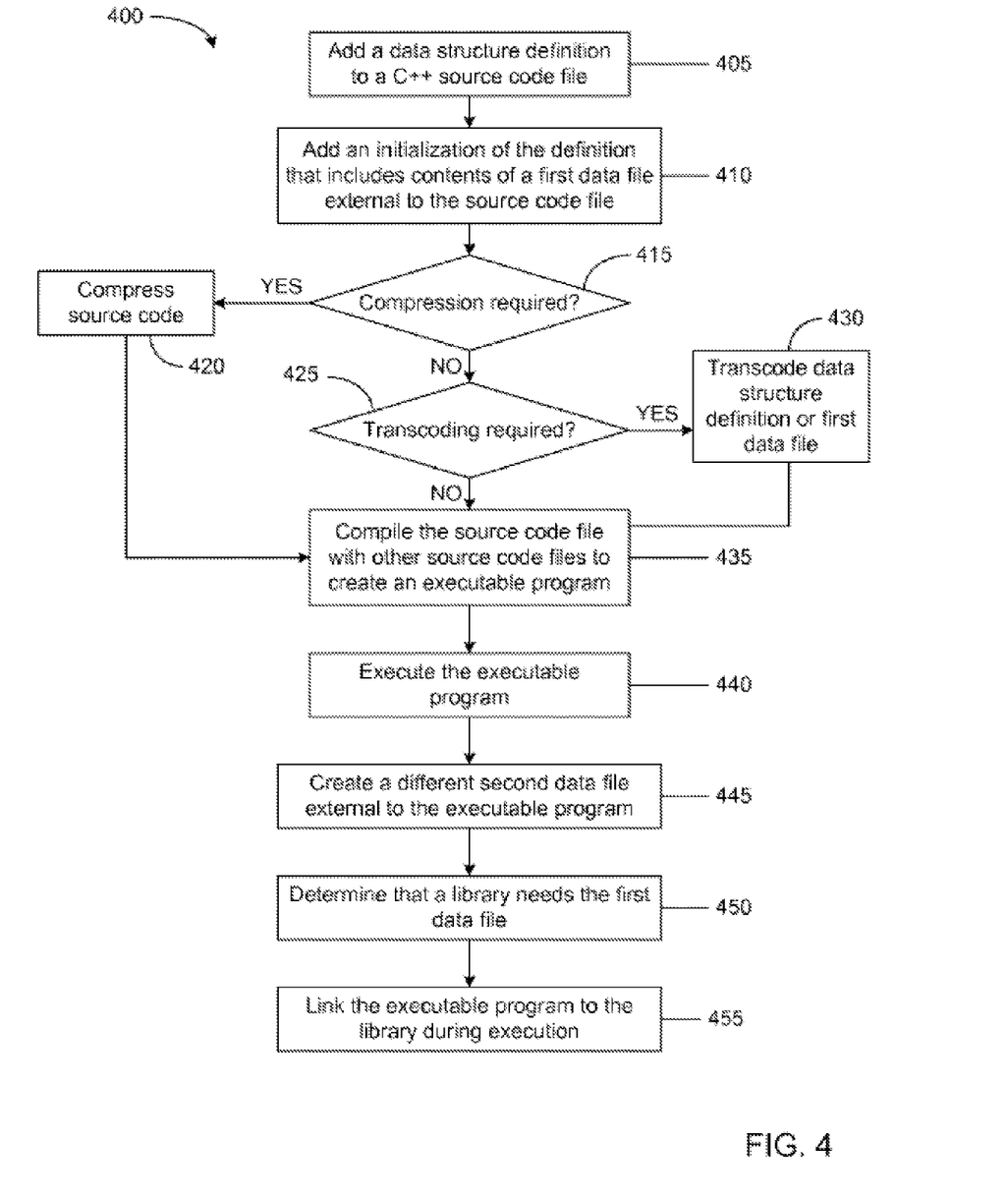
FIG. 4 shows a flowchart of an example technique for executing an application in a farm of computers.

FIG. 3 shows a flowchart of an example process 400 to execute an application in a farm of computers. The process 400 adds a data structure definition to a source code file, for example, a C++ source code file at 405. The process 400 adds an initialization of the definition that includes contents of a first data file external to the source code file at 410. Further, the process 400 adds the initialization values to the source code file. In some implementations, the process 400 checks if compressing the source code file, for example, the byte array, is required at 415. For example, if the size of the data structure definition or the first data file or both is so large that compiling the source code file is time and/or resource intensive, for example, because the object file containing the data takes too much memory, then the source code file may need to be compressed. In such implementations, if the process 400 determines that compression is required, then process 400 compresses the source code at 420. In some implementations, the process 400 checks if transcoding is required at 425. If the data structure definition or the data in the first data file is encoded in a scheme that is different from the encoding scheme of the source code file, then the code of the data structure definition or the data in the first data file may need to be changed, i.e., transcoded, into that of the source code file. For example, Chinese characters have a different encoding scheme than English characters. Chinese third party applications may require data including English content. In such scenarios, the encoding of the English content can be changed from English to Unicode Transformation Format (UTF) prior to compiling. In such implementations, if the process 400 determines that transcoding is required, then process 400 transcodes the data structure definition or the first data file, as required at 430. By transcoding the data file into the byte array in the source code, the process 400 can transcode to interface between the two types of encoding schemes.

The process 400 compiles the source code file with other source code files to create an executable program at 435. The process 400 executes the executable program at 440. Alternatively, the executable program can be executed by another process, for example, one executed by an application execution unit 220. Executing the process creates a different second data file external to the executable program at 445. The process 400 determines that a library needs the first data file 450. In response, the process 400 links the executable program to the library during execution at 455, for example, by passing the path of the second data file to the library.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, more than one data file can be required for the application to execute. In such implementations, multiple data structure definitions can be added to the source code file. Also, corresponding initializations of the definition that includes contents of the data files can be added to the source code file. Upon compilation, the binary image can include multiple byte arrays, each representing a data file. In some scenarios, the data file that is converted into a byte-array and compiled with the source code file is not located at the beginning of the ".cc" file obtained by compiling, but is rather offset from the beginning. In such scenarios, the data processing apparatus 225 can be configured to create an offset to read the byte-array from any position in the ".cc" file, specifically, for example, the offset position. In some implementations, a header file and object code can be generated by compiling. The header file can include the name of the data file using which the compiled data file can be added to the binary image. In some implementations, the source files can be generated by a script.

What is claimed is:

1. A computer-implemented method comprising:
adding, by a data processing apparatus, a data structure definition to a high-level programming language source code file and initialization values for the data structure definition, wherein the initialization values comprise contents of a first data file external to the high-level programming language source code file;
compiling, by the data processing apparatus, the high-level programming language source code file with one or more other high-level programming language source code files to create an executable program that includes the initialization values as part of an image of the executable program, wherein, during compilation of the high-level programming language source code file, a library is determined to depend on the first data file, and wherein the executable program is linked to the library; and
executing, by the data processing apparatus, the executable program, wherein, during execution of the executable program, the executable program is configured to create a different second data file external to the executable program by reading the initialization values from the data structure definition and writing the initialization values to the different second data file accessible by the library linked to the executable program.

2. The computer-implemented method of claim 1, wherein the different second data file is created in a directory local to a working directory of the executable program.

3. The computer-implemented method of claim 1, further comprising encoding, by the data processing apparatus, the initialization values.

4. The computer-implemented method of claim 1, further comprising compressing, by the data processing apparatus, the initialization values, wherein the executable program includes logic to decompress a compressed byte array included in the high-level programming language source code file to create the different second data file.

5. The computer-implemented method of claim 1, wherein the one or more other high-level programming language source code files include logic that causes the executable program to create the different second data file during the execution.

6. The computer-implemented method of claim 1, further comprising deploying, by the data processing apparatus, copies of the executable program to a plurality of computers.

7. A non-transitory computer-readable medium tangibly embodying software instructions executable by a data processing apparatus to perform operations comprising:
adding, by the data processing apparatus, a data structure definition to a high-level programming language source code file and initialization values for the data structure definition, wherein the initialization values comprise contents of a first data file external to the high-level programming language source code file;
compiling, by the data processing apparatus, the high-level programming language source code file with one or more other high-level programming language source code files to create an executable program that includes the initialization values as part of an image of the executable program, wherein, during compilation of the high-level programming language source code file, a library is determined to depend on the first data file, and wherein the executable program is linked to the library; and
executing, by the data processing apparatus, the executable program, wherein, during execution of the executable program, the executable program is configured to create a different second data file external to the executable program by reading the initialization values from the data structure definition and writing the initialization values to the different second data file accessible by the library linked to the executable program.

8. The non-transitory computer-readable medium of claim 7, wherein the different second data file is created in a directory local to a working directory of the executable program.

9. The non-transitory computer-readable medium of claim 7, wherein the operations further comprise encoding, by the data processing apparatus, the initialization values.

10. The non-transitory computer-readable medium of claim 7, wherein the operations further comprise compressing, by the data processing apparatus, the initialization values, wherein the executable program includes logic to decompress a compressed byte array included in the high-level programming language source code file to create the different second data file.

11. The non-transitory computer-readable medium of claim 7, wherein the one or more other high-level programming language source code files include logic that causes the executable program to create the different second data file during the execution.

12. The non-transitory computer-readable medium of claim 7, wherein the operations further comprise deploying, by the data processing apparatus, copies of the executable program to a plurality of computers.

13. A system comprising:
a data processing apparatus;
a non-transitory computer-readable medium tangibly embodying software instructions executable by the data processing apparatus to perform operations comprising:
adding, by the data processing apparatus, a data structure definition to a high-level programming language source code file and initialization values for the data structure definition, wherein the initialization values comprise contents of a first data file external to the high-level programming language source code file;
compiling, by the data processing apparatus, the high-level programming language source code file with one or more other high-level programming language source code files to create an executable program that includes the initialization values as part of an image of the executable program, wherein, during compilation of the high-level programming language source code file, a library is determined to depend on the first data file, and wherein the executable program is linked to the library; and
executing, by the data processing apparatus, the executable program, wherein, during execution of the executable program, the executable program is configured to create a different second data file external to the executable program by reading the initialization values from the data structure definition and writing the initialization values to the different second data file accessible by the library linked to the executable program.

14. The system of claim 13, wherein the operations further comprise encoding, by the data processing apparatus, the initialization values.

15. The system of claim 13, wherein the operations further comprise compressing, by the data processing apparatus, the initialization values, wherein the executable program includes logic to decompress a compressed byte array included in the high-level programming language source code file to create the different second data file.

16. The system of claim 13, wherein the one or more other high-level programming language source code files include logic that causes the executable program to create the different second data file during the execution.

17. The system of claim 13, wherein the operations further comprise deploying, by the data processing apparatus, copies of the executable program to a plurality of computers.

* * * * *